US010425795B2

(12) United States Patent
Mutikainen et al.

(10) Patent No.: US 10,425,795 B2
(45) Date of Patent: Sep. 24, 2019

(54) METHOD AND APPARATUS FOR SUPPORTING AN EMERGENCY CALL SERVICE IN AN IP MULTIMEDIA SUBSYSTEM SESSION DURING HANDOVER

(71) Applicant: Nokia Technologies Oy, Espoo (FI)

(72) Inventors: Jari Kalevi Mutikainen, Lepsama (FI); Miikka Poikselka, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/501,131

(22) PCT Filed: Aug. 22, 2014

(86) PCT No.: PCT/IB2014/064031
§ 371 (c)(1),
(2) Date: Feb. 1, 2017

(87) PCT Pub. No.: WO2016/027136
PCT Pub. Date: Feb. 25, 2016

(65) Prior Publication Data
US 2017/0223515 A1 Aug. 3, 2017

(51) Int. Cl.
*H04M 11/04* (2006.01)
*H04W 4/90* (2018.01)
(Continued)

(52) U.S. Cl.
CPC ........... *H04W 4/90* (2018.02); *H04L 65/1016* (2013.01); *H04L 69/08* (2013.01); *H04W 36/0022* (2013.01)

(58) Field of Classification Search
CPC ........................ H04W 76/007; H04W 36/0083
(Continued)

(56) References Cited

U.S. PATENT DOCUMENTS

2009/0080382 A1\* 3/2009 Chen ................. H04W 36/0016
370/331
2009/0253403 A1 10/2009 Edge et al.
(Continued)

FOREIGN PATENT DOCUMENTS

| CN | 102244910 A | 11/2011 |
|---|---|---|
| CN | 103096406 A | 5/2013 |

(Continued)

OTHER PUBLICATIONS

International Search Report and Written Opinion received for corresponding Patent Cooperation Treaty Application No. PCT/IB2014/064031, dated Apr. 21, 2015, 14 pages.
(Continued)

*Primary Examiner* — Kiet M Doan
(74) *Attorney, Agent, or Firm* — Alston & Bird LLP

(57) ABSTRACT

A method, apparatus and computer program product are provided to facilitate the handover from a packet switched network to a circuit switched network while an Internet protocol (IP) multimedia subsystem (IMS) session is ongoing. In the context of a method, a notification is received of the handover from a packet switched network to a circuit switched network while an IMS session is ongoing. The method also receives an indication that an emergency call service is active in the IMS session and determines that media resources in the circuit switched network are required to support the emergency call service, as supplemented by a minimum set of emergency related data, that is active in the IMS session. The method may further include causing the media resources to be reserved in the circuit switched network to support the emergency call service that is active in the IMS session.

18 Claims, 11 Drawing Sheets

(51) Int. Cl.
  *H04W 36/00* (2009.01)
  *H04L 29/06* (2006.01)
(58) Field of Classification Search
  USPC ....... 370/330, 356, 259, 242, 252, 260, 235,
    370/331; 455/404.1, 435.1, 404.2, 456.2,
    455/432.1, 560
  See application file for complete search history.

(56) References Cited

U.S. PATENT DOCUMENTS

| | | | |
|---|---|---|---|
| 2010/0054209 A1* | 3/2010 | Mahdi | H04W 36/0022 370/331 |
| 2011/0228707 A1 | 9/2011 | Multikainen et al. | |
| 2012/0008592 A1* | 1/2012 | Thomas | H04W 36/0022 370/331 |
| 2012/0076109 A1 | 3/2012 | Lindholm et al. | |
| 2013/0063540 A1 | 3/2013 | Zisimopoulos et al. | |
| 2013/0315072 A1* | 11/2013 | Hietalahti | H04W 76/02 370/242 |
| 2015/0365980 A1 | 12/2015 | Meng et al. | |

FOREIGN PATENT DOCUMENTS

| | | |
|---|---|---|
| CN | 103533585 A | 1/2014 |
| CN | 103561432 A | 2/2014 |
| WO | WO-2013/114158 A1 | 8/2013 |
| WO | 2013135316 A1 | 9/2013 |
| WO | WO-2013/135282 A1 | 9/2013 |

OTHER PUBLICATIONS

3GPP TS 23.216 V12.1.0 (Jun. 2014); 3GPP Technical Specification Group Services ans System Aspects; Single Radio Voice Call Continuity (SRVCC); Stage 2 Releae 12.

Rosen, B. "Updating Additional Data related to an Emergency Call using Subscribe/Notify draft-rosen-ecrit-addldata-subnot-01.txt." (retrieved Oct. 31, 2017) Retrieved from the Internet: <URL: http://tools.ietf.org/html/draft-rosen-ecrit-addldata-subnot-01> (dated Nov. 4, 2013); 8 pages.

Rosen, B. et al. "Additional Data related to an Emergency Call draft-ietf-ecrit-additional-data-21.txt" (retrieved Oct. 31, 2017) Retrieved from the Internet: <URL: https://tools.ietf.org/html/draft-ietf-ecrit-additional-data-21> (dated Mar. 8, 2014); 97 pages.

Rosen, B. et al. "Internet Protocol-based In-vehicle Emergency Call draft-rosen-ecrit-ecall-10.txt" (retrieved Oct. 31, 2017) Retrieved from the Internet: <URL: https://tools.ietf.org/id/draft-rosen-ecrit-ecall-10.txt> (dated Jul. 14, 2013); 12 pages.

Supplementary European Search Report for Application No. EP 14 89 9929 dated Feb. 13, 2018, 8 pages.

3GPP TS 26.267, V12.0.0, $3^{rd}$ Generation Partnership Project; Technical Specification Group Services and System Aspects; 3Call Data Transfer; In-Band Modem Solution; General Description (Release 12) (dated Dec. 2012), 36 pages.

Draft ETSI TR 103 140, V0.7.1, Mobile Standards Group (MSG); eCall for VoIP (dated Mar. 2014), 63 pages.

"3rd Generation Partnership Project; Technical Specification Group Services and System Aspects; IP Multimedia Subsystem (IMS) Service Continuity; Stage 2 (Release 12)", 3GPP Standard; 3GPP TS 23.237, 3rd Generation Partnership Project (3GPP), Mobile Competence Centre; 650, Route Des Lucioles; F-06921 Sophia-Antipolis Cedex; France, vol. SA WG2, No. V12.7.0, Jun. 20, 2014 (Jun. 20, 2014), pp. 1-172, XP050774101, [retrieved on Jun. 20, 2014].

Ericsson "New WID for SEVCC Enhancements for Transcoding Avoidance", 3GPP draft; S2-142352, 3rd Generation Partnership Project (3GPP), Mobile Competence Centre; 650, Route Des Lucioles; F-06921 Sophia-Antipolis Cedex; France, vol. SA WG2, No. Dublin Ireland; Jul. 7, 2014-Jul. 11, 2014, Jul. 2, 2014; XP050836798; [retrieved from Internet] URL: http://www.3gpp.org/ftp/tsg_sa/WG2_Arch/TSGS2_104_Dublin/Docs [retrieved on Jul. 2, 2014].

Office Action for European Application No. 14899929.5, dated Apr. 24, 2018, 7 pages.

3GPP TR 23.870 v9.0.0 (Jun. 2009), $3^{rd}$ Generation Partnership Project Technical Specification Group Services and System Aspects; SR VCC Support for IMS Emergency Calls (release 9) (Jun. 2009) 14 pages.

3GPP TS 24.237 V14.2.0 (Dec. 2016) $3^{rd}$ Generation Partnership Project; Technical specification Group Core Network and Terminals; IP Multimedia (IM) Core Network (CN) subsystem IP Multimedia Subsystem (IMS) Service Continuity; Stage 3 (Release 14) (Dec. 2016) 492 pages.

3GPP TS 29.212 V14.1.0 (Sep. 2016) $3^{rd}$ Generation Partnership Project; Technical Specification Group Core Network and Terminals; Policy and Charging Control (PCC); Reference points (Release 14), TS 29.212 section 5.3.84 PS-to-CS-Session-Continuity AVP (Sep. 2016) 272 pages.

Office Action for Chinese Application No. 2014800814258 dated Jun. 4, 2019, 10 pages.

SRVCC Enhancements for Transcoding Avoidance, 3GPP TSG SA2 Meeting #104, SA2-142352, Ericsson (Jul. 2014) 7 pages.

* cited by examiner

METHOD AND APPARATUS FOR SUPPORTING AN EMERGENCY CALL SERVICE IN AN IP MULTIMEDIA SUBSYSTEM SESSION DURING HANDOVER

RELATED APPLICATION

This application was originally filed as Patent Cooperation Treaty Application No. PCT/IB2014/064031 filed Aug. 22, 2014.

TECHNOLOGICAL FIELD

An example embodiment relates generally to facilitating a handover from a packet switched network to a circuit switched network while an Internet protocol (IP) multimedia subsystem (IMS) session is ongoing and, more particularly, to continuing to support an emergency call service that is active in the IMS session during handover from the packet switched network to the circuit switched network.

BACKGROUND

Single radio voice call continuity (SRVCC) permits a packet switched network operator to move voice services to a circuit switched network. SRVCC for voice calls was first defined in release 8 of the third generation partnership project (3GPP). SRVCC was extended in later releases, such as for voice calls in an alerting call state and for calls with active mid-call services, for example, hold, conferencing, etc. Further, 3GPP release 9 defined SRVCC for IMS emergency voice calls.

eCall is a European initiative intended to bring rapid assistance to motorists involved in a collision. eCall provides an emergency call service for vehicles and is defined in 3GPP and by the European Telecommunications Standards Institute (ETSI). eCall utilizes an audio codec to provide the emergency call service that is initiated from a vehicle and to provide certain information regarding the vehicle, such as the location of the vehicle, the vehicle identification number, etc. The eCall audio codec provides this information regarding the vehicle in-band in an emergency call, such as an IMS emergency voice call. This data is termed a minimum set of emergency related data (MSD). The MSD may be carried in various manners over IMS. For example, the initial MSD from the in-dash vehicle system (IVS) to the public safety answering point (PSAP) may be carried as the body of an INVITE message. In this example, the PSAP can subsequently require an update to the MSD during an ongoing eCall session with the updated MSD being carried in the body of an INFO transaction or a SUBSCRIBE/NOTIFY transaction.

BRIEF SUMMARY

A method, apparatus and computer program product are provided in accordance with an example embodiment in order to facilitate the handover from a packet switched network to a circuit switched network while an IMS session is ongoing. In an instance in which an emergency call service, such as an eCall session, is active in the IMS session at the time of the handover, the method, apparatus and computer program product of an example embodiment may cause the media resources required to support the emergency call service, such as an eCall session, to be reserved in the circuit switched network such that the emergency call service, such as an eCall session, may continue following handover from the packet switched network to the circuit switched network. Thus, the method, apparatus and computer program product of an example embodiment permit emergency call services that are active in an IMS session to continue to be supported following an SRVCC handover to a circuit switched network. Consequently, the MSD provided by the emergency call service, such as an eCall session, may continue to be provided so as to facilitate emergency services.

In an example embodiment, a method is provided that includes receiving notification of the handover from a packet switched network to a circuit switched network while an Internet protocol multimedia subsystem session is ongoing. The method of this example embodiment also receives an indication that an emergency call service is active in the IMS session and determines that media resources in the circuit switched network are required to support the emergency call service, as supplemented by a minimum set of emergency related data, that is active in the IMS session. In this example embodiment, the method further includes causing the media resources to be reserved in the circuit switched network to support the emergency call service, as supplemented by the minimum set of emergency related data, that is active in the IMS session.

The method of an example embodiment may receive the indication that an emergency call service is active in the IMS session by receiving a request over the Sv interface from the mobility management entity for the emergency call service that is active in the IMS session to be handed over to the circuit switched network. In this example embodiment, the method may receive the request by receiving the single radio voice call continuity packet switched network to circuit switched network request that includes an information element having a flag indicative of the emergency call service that is active in the IMS session and that is to be handed over to the circuit switched network.

The method of an example embodiment may also include causing a domain transfer request to be sent to an IMS network in response to receiving notification of the handover from the packet switched network to the circuit switched network while the IMS session is ongoing. The method of this example embodiment may also receive the indication that the emergency call service is active in the IMS session by receiving the indication in response to sending the domain transfer request. In an example embodiment, the method may receive the indication that the emergency call service is active in the IMS session by receiving a state-and-event information message from an emergency access transfer function that includes an element indicating that emergency call services is active in the IMS session. In an alternative embodiment, the method may receive the indication that the emergency call service is active in the IMS session by receiving a service uniform resource name that provides the indication that the emergency call service is active in the IMS session.

The method of an example embodiment may receive the indication that the emergency call service is active in the IMS session by receiving the indication within a handover complete message. In a further example embodiment, the method may also include receiving a request for an updated minimum set of data, performing a protocol conversion upon the request following the handover from the packet switched network to the circuit switched network and causing a request for the updated minimum set of data to be transmitted toward a user equipment following the protocol conversion.

In another example embodiment, an apparatus is provided that includes at least one processor and at least one memory including computer program code with the at least one memory and the computer program code configured to, with the processor, cause the apparatus to at least receive notification of the handover from a packet switched network to a circuit switched network while an Internet protocol multimedia subsystem session is ongoing. The at least one memory and the computer program code are also configured to, with the processor, cause the apparatus of this example embodiment to receive an indication that an emergency call service is active in the IMS session and to determine that media resources in a circuit switched network are required to support the emergency call service, as supplemented by a minimum set of emergency related data, that is active in the IMS session. The at least one memory and the computer program code are further configured to, with the processor, cause the apparatus of this example embodiment to cause the media resources to be reserved in the circuit switched network to support the emergency call service, as supplemented by the minimum set of emergency related data, that is active in the IMS session.

The at least one memory and the computer program code may be configured to, with the processor, cause the apparatus of an example embodiment to receive the indication that the emergency call service is active in the IMS session by receiving the request over the Sv interface from the mobility management entity for the emergency call service that is active in the IMS session to be handed over to the circuit switched network. The at least one memory and the computer program code may be configured to, with the processor, cause the apparatus of this example embodiment to receive the request by receiving a single radio voice call continuity packet switched network to circuit switched network request that includes an information element having a flag indicative of the emergency call service that is active in the IMS session and that is to be handed over to the circuit switched network.

The at least one memory and the computer programming code may be further configured to, with the processor, cause the apparatus of an example embodiment to cause a domain transfer request to be sent to an IMS network in response to receiving notification of the handover from the packet switched network to the circuit switched network while the IMS session is ongoing. The at least one memory and the computer program code may also be configured to, with the processor, cause the apparatus of an example embodiment to receive the indication that the emergency call service is active in the IMS session by receiving the indication in response to sending the domain transfer request. The at least one memory and the computer program code may be configured to, with the processor, cause the apparatus of an example embodiment to receive the indication that the emergency call service is active in the IMS session by receiving a state-and-event information message from an emergency access transfer function that includes an element indicating that the emergency call service is active in the IMS session. The at least one memory and the computer program code may be configured to, with the processor, cause the apparatus of another example embodiment to receive the indication that the emergency call service is active in the IMS session by receiving a service uniform resource name that provides the indication that the emergency call service is active in the IMS session.

The at least one memory and the computer program code may be configured to, with the processor, cause the apparatus of an example embodiment to receive the indication that the emergency call service is active in the IMS session by receiving the indication within a handover complete message. The at least one memory and the computer program code may be further configured to, with the processor, cause the apparatus of a further example embodiment to receive a request for an updated minimum set of data, perform a protocol conversion upon the request following the handover from the packet switched network to the circuit switched network and cause a request for the updated minimum set of data to be transmitted toward a user equipment following the protocol conversion.

In a further example embodiment, a computer program product is provided that includes at least one non-transitory computer-readable storage media having computer-executable program code portions stored therein with the computer-executable program code portions including program code instructions for receiving notification of the handover from a packet switched network to a circuit switched network while an Internet protocol multimedia subsystem session is ongoing. The computer-executable program code portion of an example embodiment also includes program code instructions for receiving an indication that an emergency call service is active in the IMS session and program code instructions for determining that media resources in the circuit switched network are required to support the emergency call service, as supplemented by a minimum set of emergency related data, that is active in the IMS session. In an example embodiment, the computer-executable program code portions also include program code instructions for causing the media resources to be reserved in the circuit switched network to support the emergency call service, as supplemented by the minimum set of emergency related data, that is active in the IMS session.

The program code instructions for receiving the indication that the emergency call service is active in the IMS session may, in an example embodiment, include program code instructions for receiving a request over the Sv interface from the mobility management entity for the emergency call service that is active in the IMS session to be handed over to the circuit switched network. The program code instructions for receiving the indication that the emergency call service is active in the IMS session may, in another example embodiment, include program code instructions for receiving the indication within a handover complete message. In a further example embodiment, the computer-executable program code portions may also include program code instructions for receiving a request for an updated minimum set of data, performing a protocol conversion upon the request following the handover from the packet switched network to the circuit switched network and causing a request for the updated minimum set of data to be transmitted toward a user equipment following the protocol conversion.

The computer-executable program code portions of an example embodiment may also include program code instructions for causing a domain transfer request to be sent to an IMS network in response to receiving notification of the handover from the packet switched network to the circuit switched network while the IMS session is ongoing. The program code instructions for receiving the indication that the emergency call service is active in the IMS session may, in this example embodiment, include program code instructions for receiving the indication in response to sending of the domain transfer request.

In yet another example embodiment, an apparatus is provided that includes means for receiving notification of a handover from a packet switched network to a circuit switched network while an Internet protocol multimedia subsystem session is ongoing. The apparatus of this example embodiment also includes means for receiving an indication that an emergency call service is active in the IMS session and means for determining that media resources in the circuit switched network are required to support the emergency call service, as supplemented by a minimum set of emergency related data, that is active in the IMS session. In this example embodiment, the apparatus also includes mean for causing the media resources to be reserved in the circuit switched network to support the emergency call service, as supplemented by the minimum set of emergency related data, that is active in the IMS session.

BRIEF DESCRIPTION OF THE DRAWINGS

Figure 1:
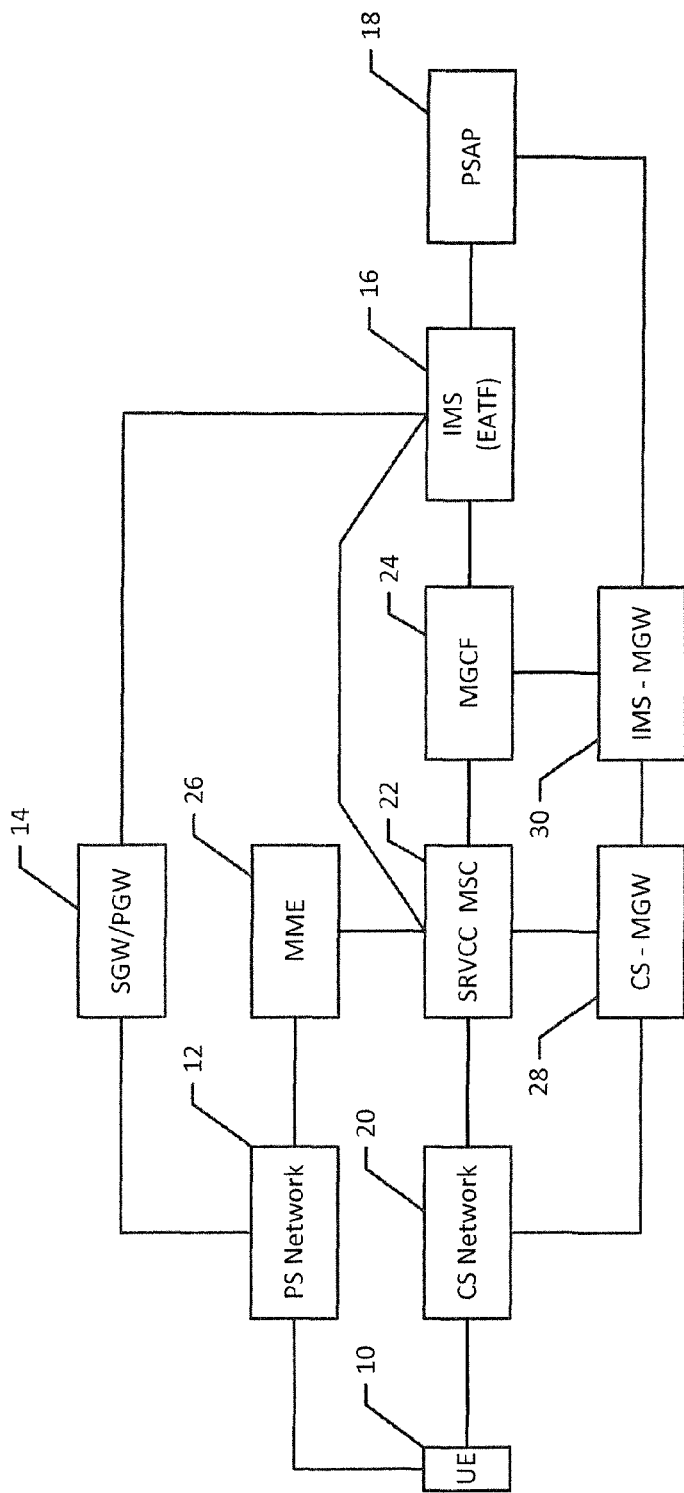
Figure 2:
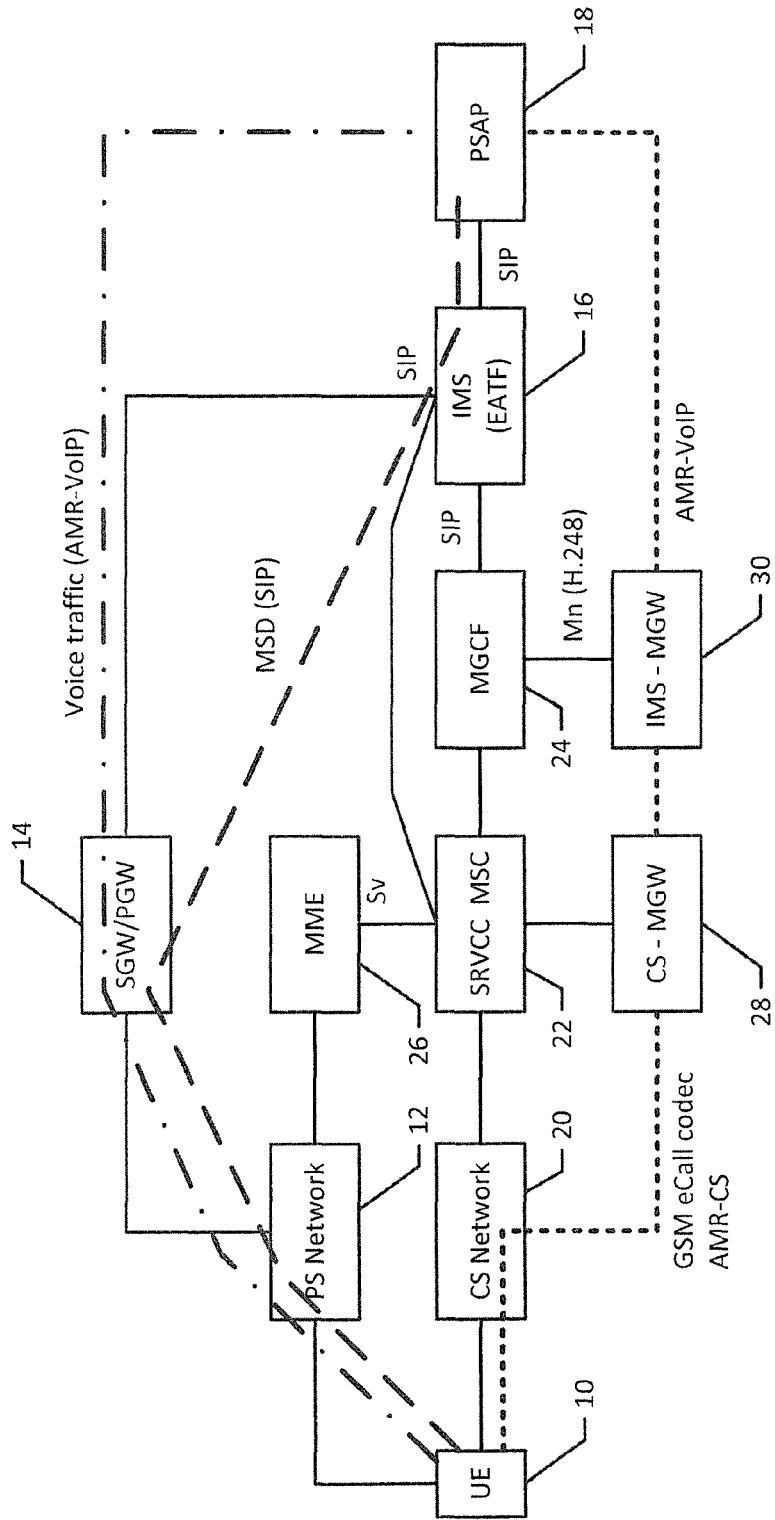
Figure 3:
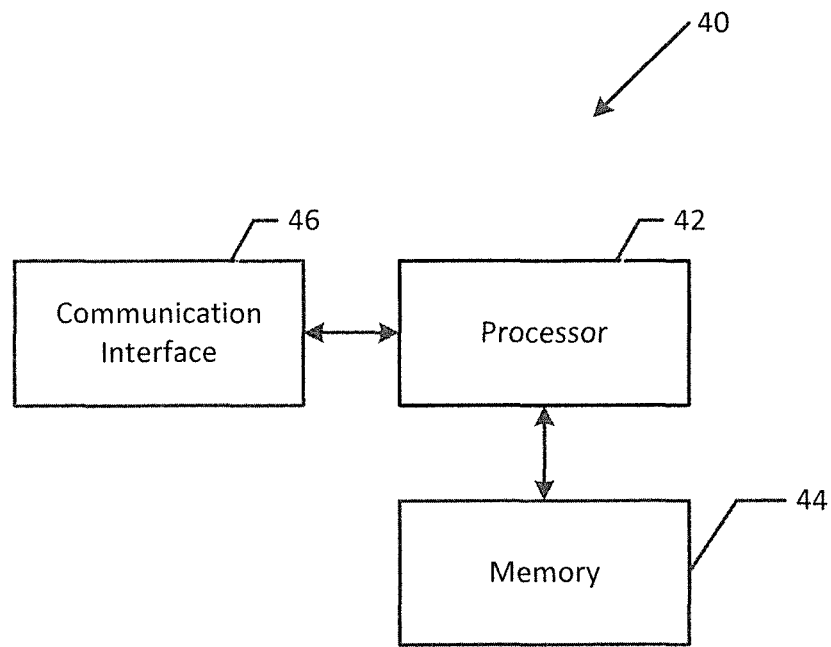
Figure 4:
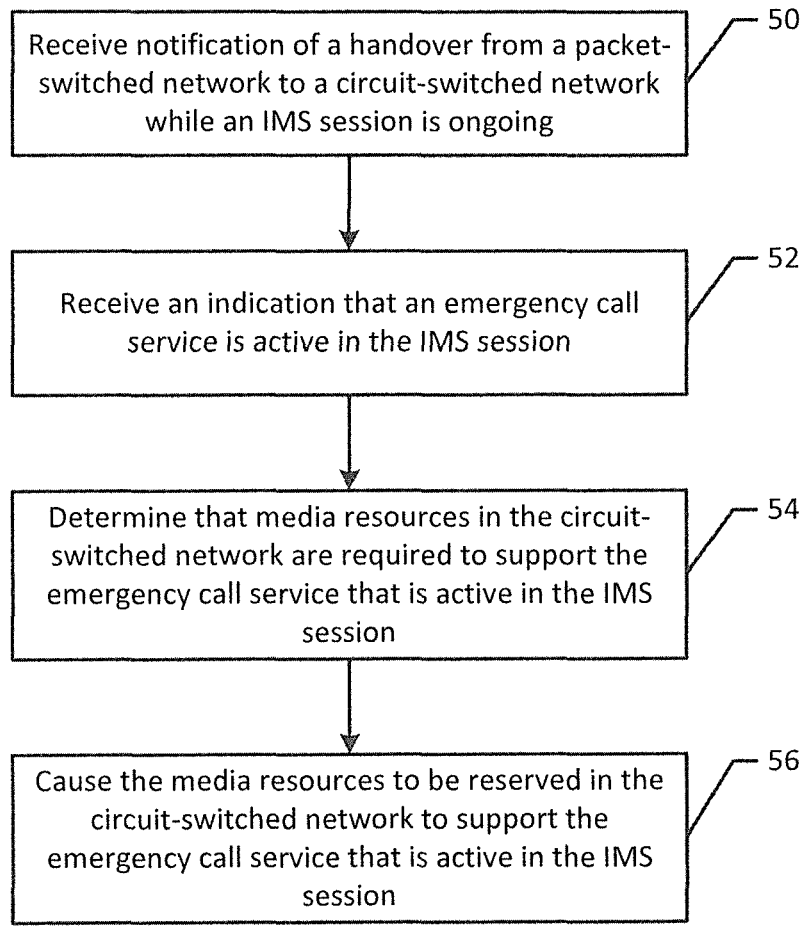
Figure 5:
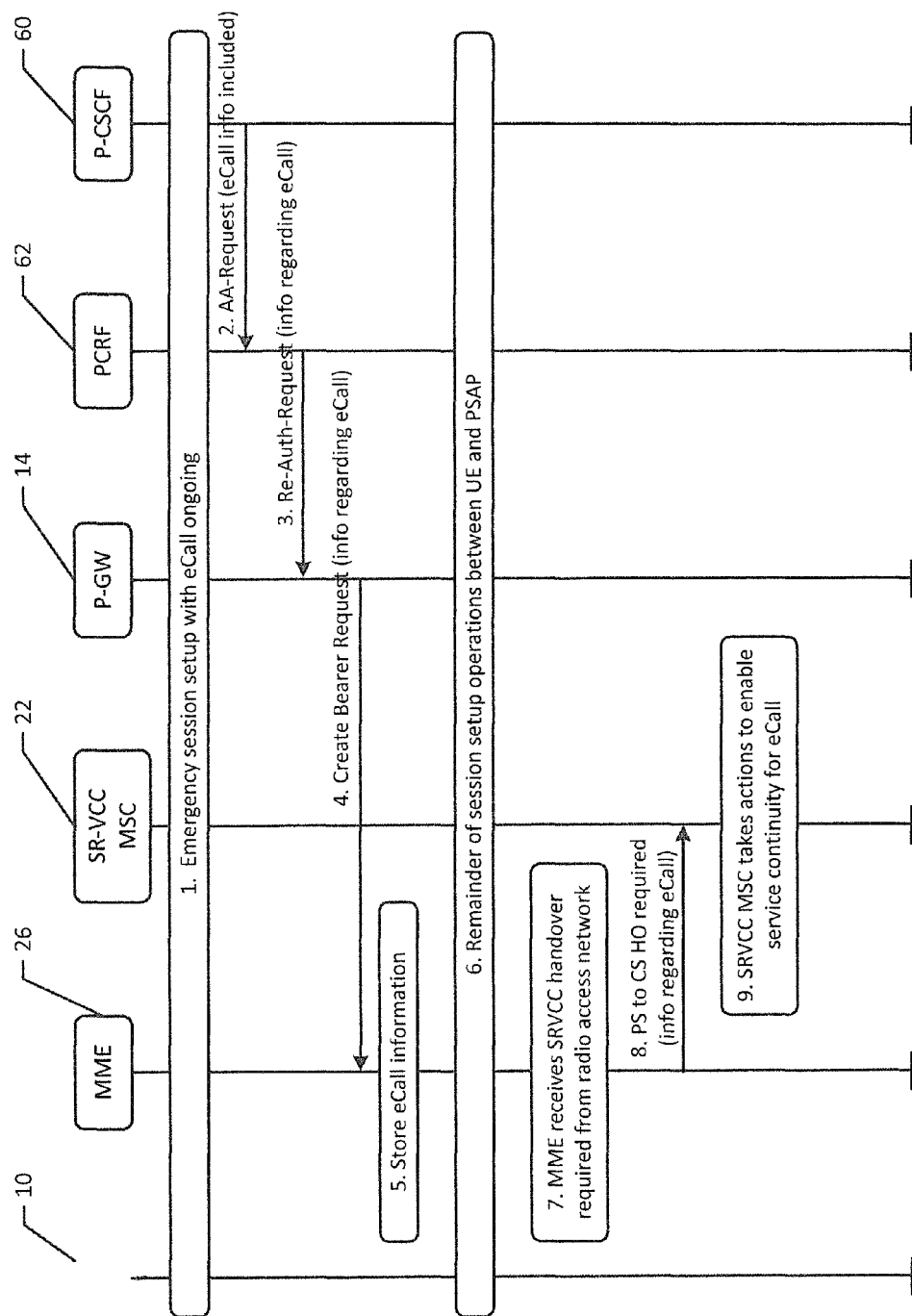
Figure 6:
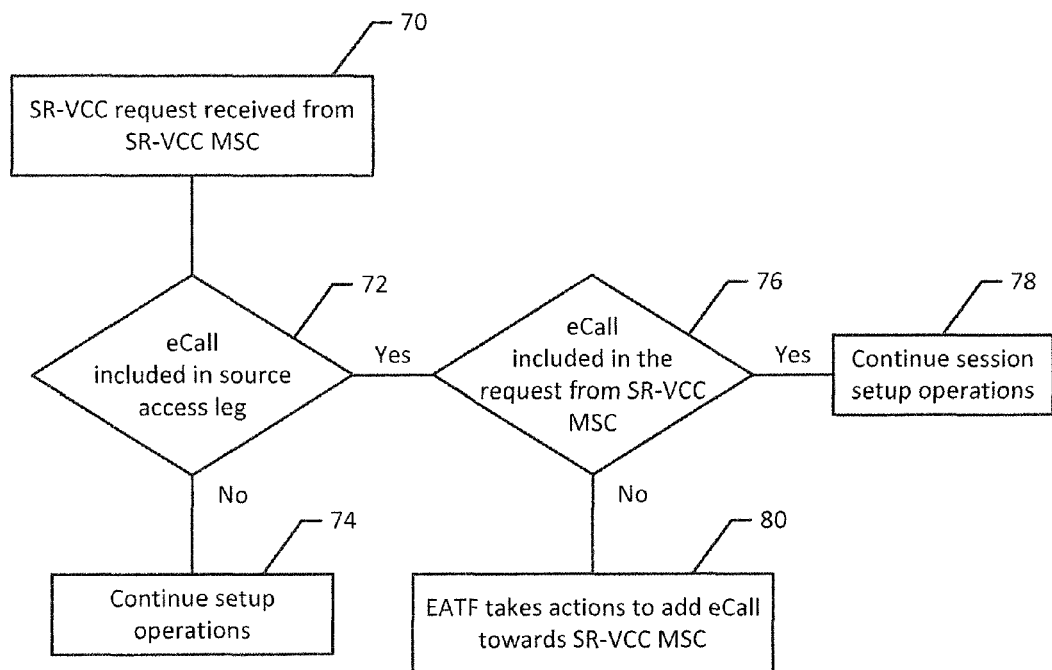
Figure 7:
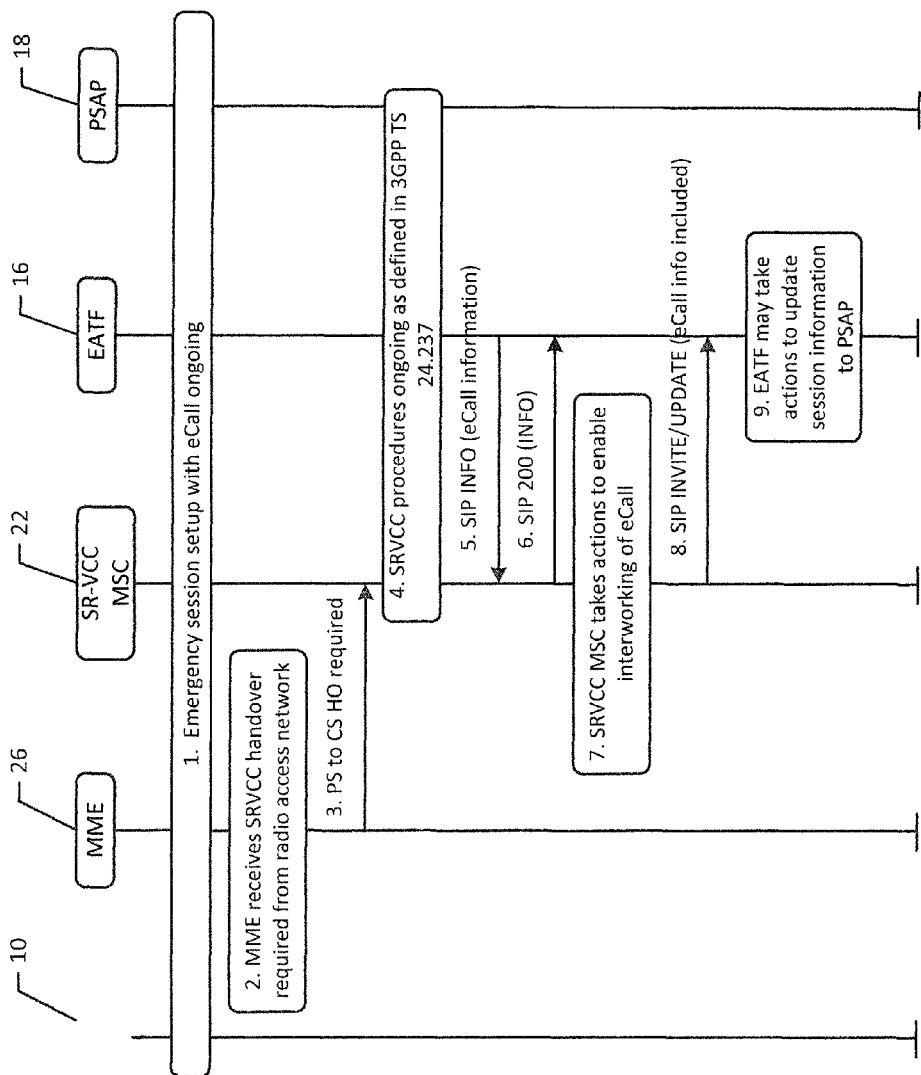
Figure 8:
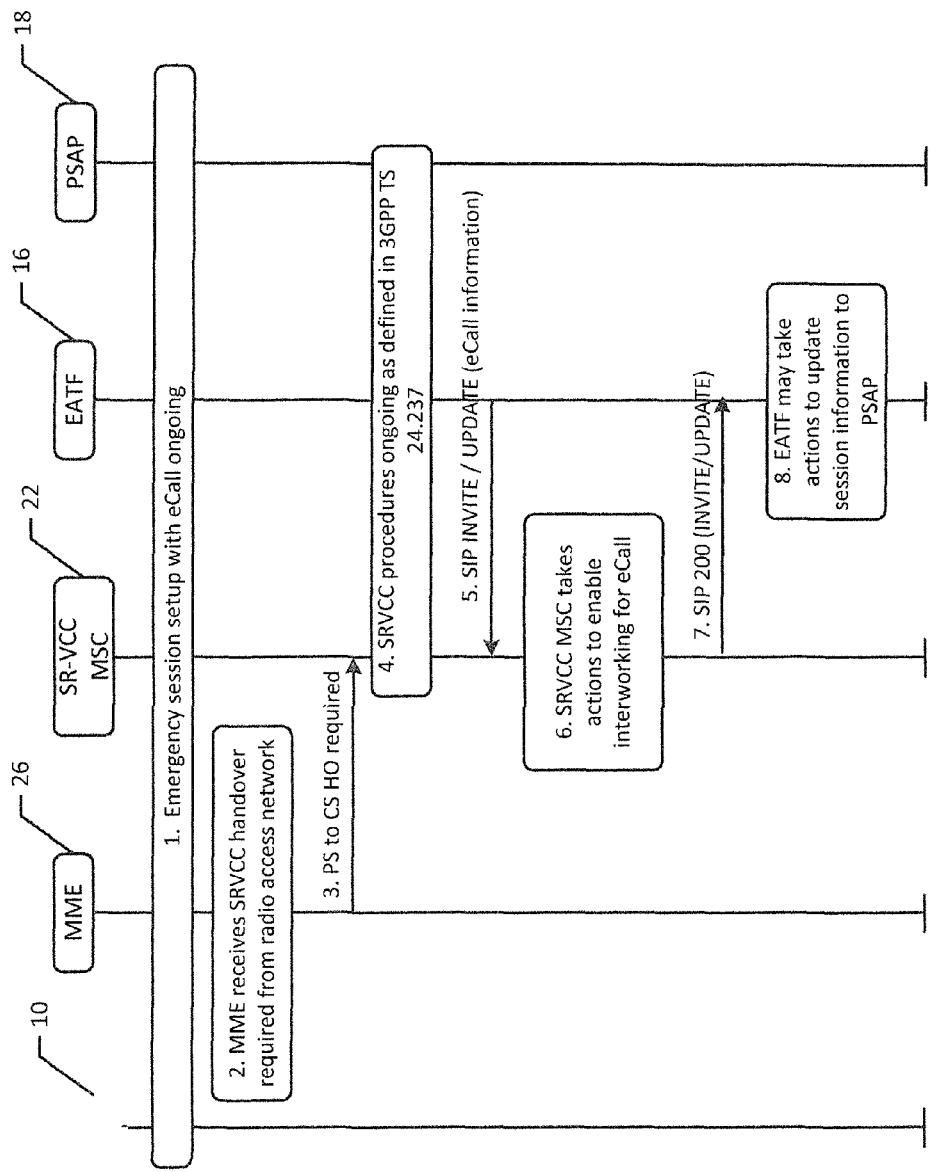
Figure 9:
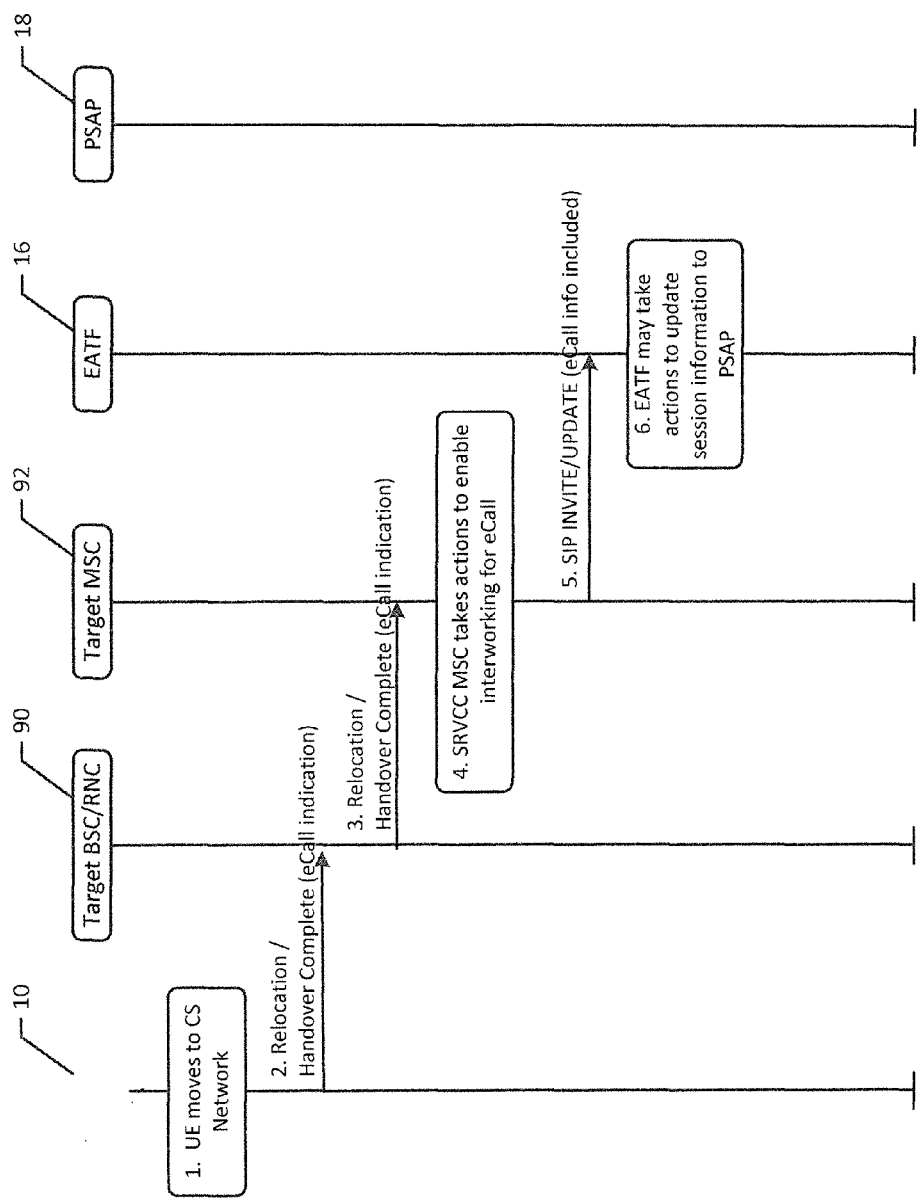
Figure 10:
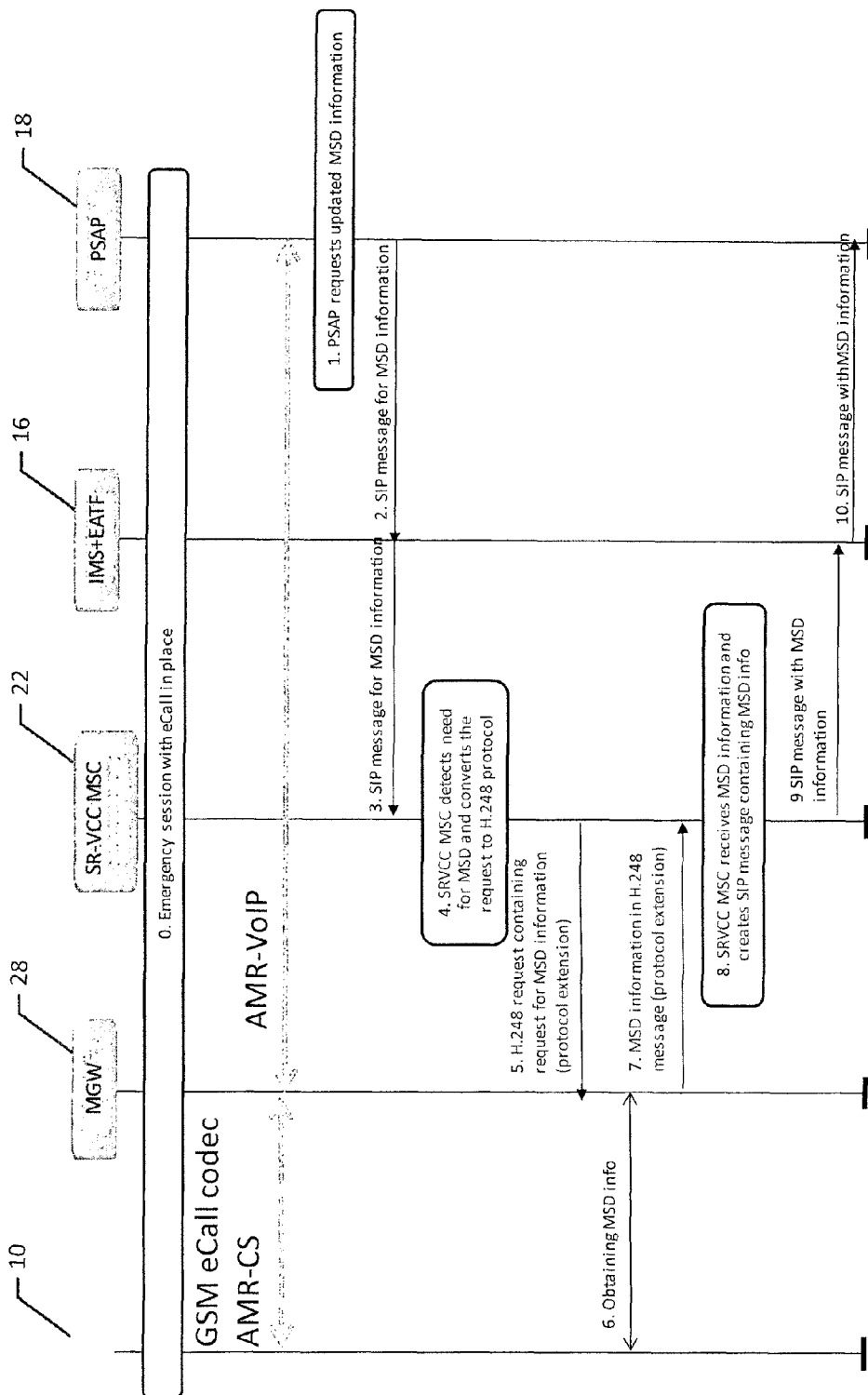
Figure 11:
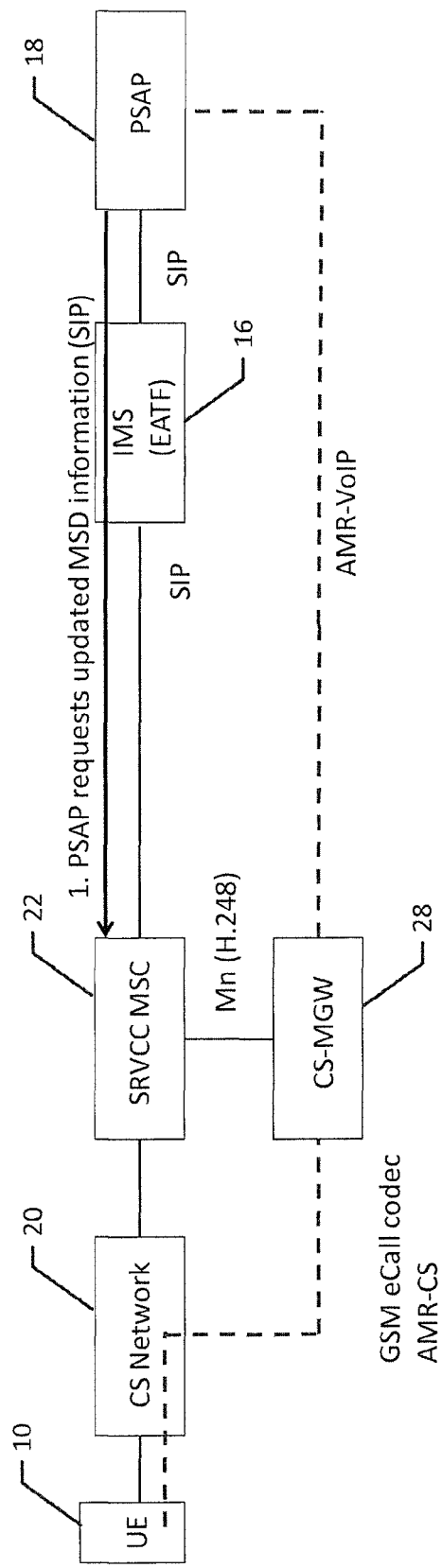

Having thus described certain embodiments of the invention in general terms, reference will now be made to the accompanying drawings, which are not necessarily drawn to scale, and wherein:

FIG. 1 is a block diagram of a system that may support a handover from a packet switched network to a circuit switched network while an Internet protocol multimedia subsystem session is ongoing;

FIG. 2 is a block diagram of the system of FIG. 1 which depicts the voice and MSD paths in the packet switched and circuit switched domains;

FIG. 3 is a block diagram of an apparatus that may be specifically configured in accordance with an example embodiment of the present invention;

FIG. 4 is a flowchart illustrating operations performed, such as by the apparatus of FIG. 3, in accordance with an example embodiment of the present invention;

FIG. 5 is a signal flow diagram in accordance with an example embodiment of the present invention in which a mobile switching center receives the indication that an emergency call service is active in the IMS session by receipt of a request over the Sv interface from a mobility management entity (MME) for the emergency call service that is active in the IMS session to be handed over to the circuit switched network in accordance with an example embodiment of the present invention;

FIG. 6 is a flowchart illustrating operations performed regarding the receipt of an indication that an emergency call service is active in the IMS session from an emergency access transfer function (EATF) in accordance with an example embodiment of the present invention;

FIG. 7 is a signaling flow diagram in which the EATF utilizes an SRVCC alerting procedure to indicate that an emergency call service is active in the IMS session in accordance with an example embodiment of the present invention;

FIG. 8 is a signaling flow diagram in which the EATF utilizes a third party call control procedure to indicate that an emergency call service is active in the IMS session in accordance with an example embodiment of the present invention;

FIG. 9 is a signaling flow diagram in which the indication that the emergency call service is active in the IMS session is received by the mobile switching center within a handover complete message in accordance with an example embodiment of the present invention;

FIG. 10 is a signaling flow diagram in which a request for updated MSD information undergoes a protocol translation following handover to a circuit switched network in accordance with an example embodiment of the present invention; and FIG. 11 is a block diagram of a network that provides for a protocol translation of a request for updated MSD information following handover to a circuit switched network in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," which refers to a non-transitory physical storage medium (for example, volatile or non-volatile memory device), can be differentiated from a "computer-readable transmission medium," which refers to an electromagnetic signal.

User equipment (UE) may be engaged in an ongoing eCall session when SRVCC provides for a handover from a packet switched network to a circuit switched network. When the UE is handed over to the circuit switched network, such as a second generation (2G) or third generation (3G) network, the eCall session should continue within the circuit switched domain. However, neither the SRVCC mobile switching center (MSC) nor the media gateway control function (MGCF) have been aware of the ongoing eCall session in the IMS session. As such, the SRVCC MSC and the MGCF have not reserved the resources required for continued support of the eCall session. For example, the SRVCC MSC has not reserved the media resources from the circuit switched (CS) media gateway (MGW) for the eCall codec. Similarly, the MGCF has not reserved the resources from the IMS-MGW for the eCall codec and has also not reserved the resources to provide an H.248 conversion that is needed to carry the MSD between the IMS-MGW and the MGCF. As such, the eCall session has not conventionally continued following SRVCC-initiated handover of the UE and its IMS session from the packet switched network to a circuit switched network. Thus, even though the public safety answering point should be able to acquire an updated MSD from the UE at any time during an ongoing eCall session, the MSD provided by an eCall session may not heretofore be able to be provided so as to facilitate the emergency services in an instance in which there is a handover attributable to SRVCC from a packet switched network to a circuit switched network during an ongoing IMS session that includes an ongoing eCall session.

A method, apparatus and computer program product are therefore provided in accordance with an example embodiment in order to facilitate handover from a packet switched (PS) network to a circuit switched network while an Internet protocol multimedia subsystem session is ongoing. In this regard, the method, apparatus and computer program product of an example embodiment may support single radio voice call continuity in regards to the handover from the packet switched network to the circuit switched network while an IMS session is ongoing. In an instance in which an emergency call service, such as an eCall session, is active in the IMS session, the method, apparatus and computer program product of an example embodiment may cause media resources to be reserved in the circuit switched network to support the emergency call service that is active in the IMS session. As such, the emergency call service may continue uninterrupted during and following the handover from the packet switched network to the circuit switched network.

FIG. 1 depicts a system that may be accessed by user equipment 10. The UE may be a mobile terminal, such as a personal digital assistant (PDA), mobile telephone, smartphone, companion device, for example, a smart watch, pager, laptop computer, tablet computer, touch surface, or any combination of the aforementioned, and other types of voice and text communications systems. Alternatively, the UE may be a fixed computing device, such as a personal computer, a computer workstation or the like.

The system may support communications with the UE 10 with a packet switched network 12. Various types of packet switched networks may support communication with the UE including, for example, an evolved universal terrestrial radio access network (E-UTRAN) or other long term evolution (LTE) networks. As an alternative to the packet switched network, the system may support communications with the UE with a circuit switched network 20. A variety of circuit switched networks may support communications with the UE including, for example, a second generation (2G) or a third generation (3G) network. As shown in FIG. 1, the system may include an SRVCC MSC 22 that may utilize an integrated services digital network (ISDN) user part (ISUP) toward an MGCF 24. However, the SRVCC MSC may alternatively implement an I2 reference point utilizing session initiation protocol (SIP) toward an IMS 16, in which case a separate MGCF need not be utilized. In an example embodiment, the SRVCC MSC and the MGCF may be co-located and the MGWs may be co-located. However, the SRVCC MSC and the MGCF may be separately located and/or the MGWs may be separately located in other embodiments.

In an example embodiment depicted in FIG. 2, an IMS session may be ongoing while the UE 10 communicates via the packet switched network. As shown separate paths may be defined for the voice path in the PS domain and the MSD path in the PS domain. In regards to the voice path supported by the packet switched network, voice traffic may be directed from a gateway, such as a serving gateway (SGW) and/or a packet data network gateway (PGW) 14, to the PSAP 18 via an adaptive multi-rate (AMR)-voice over internet protocol (VoIP) codec. In regards to the MSD path, the packet switched network may communicate with the IMS 16 via a gateway, such as a serving gateway (SGW) and/or a packet data network gateway (PGW). As indicated in FIG. 1, the SGW/PGW may communicate the MSD with the IMS via SIP. The IMS may, in turn, communicate, such as with SIP, with the PSAP that may serve as a call center to answer calls, such as IMS emergency voice calls, for police, firefighting, ambulance or other emergency services.

While an IMS session, such as an IMS emergency voice call, is ongoing, the UE 10 may be handed over from the packet switched network 12 to the circuit switched network 20. The UE may be handed over for various reasons including a determination that the circuit switched network may better serve the UE than the packet switched network. An IMS emergency voice call that is ongoing during the handover from the packet switched network to the circuit switched network may continue to be supported. An emergency call service, such as an eCall session, that is active in the IMS session at the time of the handover from the packet switched network to the circuit switched network is likewise desirably supported during and following the handover such that the PSAP 18 may receive the information, such as the minimum set of data provided by an in-vehicle system in accordance with an eCall session, that is provided via the emergency call service. As such, the method, apparatus 40 and computer program product of an example embodiment cause the media resources that are required to support the emergency call service that is active in the IMS session to be reserved in the circuit switched network during the handover from the packet switched network to the circuit switched network, thereby facilitating continuity in the emergency call service of the IMS session. In this regard, following handover to the circuit switched network, the media and the MSD may both be transmitted via the same path depicted in FIG. 2 in which the media and the MSD are transmitted by a Global System for Mobile Communications (GSM) eCall codec, such as an ARM-CS codec, to the circuit switched media gateway (CS-MGW) 28 and, in turn, to the IMS-MGW 30. Thereafter, the media and the MSD may be transmitted from the IMS-MGW to the PSAP, such as via an AMR-VoIP codec.

As shown in FIG. 3, an apparatus 40 may be provided in order to provide for continuity in the emergency call service that is active in an IMS session during handover from a packet switched network 12 to the circuit switched network 20, thereby facilitating continuity in the emergency call service of the IMS session. The apparatus may be embodied by any of a variety of computing devices, such as a mobile switching center 22, a computing device, such as a network device, associated with and in communication with the mobile switching center, or the like. Regardless of the manner in which the apparatus is embodied, the apparatus may include, be associated with or otherwise in communication with a processor 42, a memory device 44 and a communication interface 46. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 40 may be embodied by an electronic device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 42 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 42 may be configured to execute instructions stored in the memory device 44 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the MSC 22 or a computing device in communication with the MSC) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 40 of the illustrated embodiment may also optionally include a communication interface 46 that may be any means such as a device or circuitry embodied in either hardware or a combination of hardware and software that is configured to receive and/or transmit data from/to other computing devices, for example, network devices or the like, in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

Referring now to FIG. 4, the operations performed, such as by the apparatus 40 of FIG. 3 are illustrated. As shown in block 50, the apparatus, such as the processor 42, the communication interface 46 or the like, may be configured to receive a notification of a handover from the packet switched network 12 to the circuit switched network 20 while an IMS session is ongoing. For example, an IMS emergency voice call may be ongoing at the time of the handover.

Additionally, the apparatus 40 may include means, such as the processor 42, the communication interface 46 or the like, for receiving an indication that an emergency call service, such as an eCall session, is active in the IMS session at the time of the handover from the packet switched network 12 to the circuit switched network 20, as shown in block 52 of FIG. 4. Further, the apparatus may also include means, such as the processor or the like, for determining that media resources in the circuit switched network are required to support the emergency call service that is active in the IMS session following the handover and means, such as the processor, the communication interface or the like, for causing the media resources to be reserved in the circuit switched network to support the emergency call service that is active in the IMS session following the handover. See blocks 54 and 56 of FIG. 4. By reserving the media resources in the circuit switched network, the emergency call service, such as the eCall session, that is active in the IMS session may continue uninterrupted during and following the handover to the circuit switched network.

The operations performed in order to reserve the media resources in the circuit switched network 20 to support the emergency call service, such as an eCall session, that is active in the IMS session during and following a handover from the packet switched network 12 to the circuit switched network may be implemented in various manners. With reference to the signaling flow diagram of FIG. 5, for example, the UE 10 and the PSAP 18 can initially negotiate the use of an emergency call service, such as an eCall session, in an IMS session (designated an emergency session) as shown in operation 1. The UE and the PSAP may negotiate the use of the emergency call service by, for example, utilizing a service uniform resource name (URN) extension urn:service:sos.ecall.automatic or urn: service: sos.ecall.manual.

In order to setup the IMS session including the emergency call service, for example, an eCall session, an application function (AF), such as a proxy-call session control function (P-CSCF) 60 that serves as the entry to the IMS domain, such as by serving as the outbound proxy server for the UE 10, may transmit the media description of the emergency call service, such as the eCall session, to the policy and charging rules function (PCRF) 62, such as via an Rx reference point in the service URN attribute value pair (AVP). For example, the P-CSCF may transmit an AA-Request including the eCall information to a PCRF as shown in operation 2. The PCRF of this example embodiment may then set the policy control and charging (PCC) rule and the quality of service (QoS) parameters for the emergency call service, such as the eCall session, in the policy and charging enforcement function (PCEF) of the PGW 14, such as via the Gx reference point. For example, the PCRF may transmit a Re-Auth Request including the eCall information to the PGW as shown in operation 3 of FIG. 5. With the proxy mobile IP (PMIP) based S5/S8 reference points, the Gxx reference point may then be utilized to set the QoS policy from the PCRF to the bearer binding and event reporting function (BBERF) in the SGW.

In the foregoing operations involving the Gx reference point and the Gxx reference point, the indication that an emergency call service, such as an eCall session, is ongoing could be provided by re-using the PS-to-CS-Session-Continuity AVP as defined for video SRVCC and extended for emergency call services, such as an eCall session. In this regard, the PS-to-CS-Session-Continuity AVP (AVP code 1099) is of a type Enumerated and indicates whether the service data flow is a candidate for PS-to-CS session continuity as specified in 3GPP Technical Specification (TS) 23.216. In addition to a value of 0 to indicate that the service data flow carries video and is a candidate for PS to CS session continuity, the value of the PS-to-CS-Session-Continuity AVP may be set to 1 to indicate that the service data flow supports the emergency call service, such as an eCall session, and is a candidate for PS to CS session continuity. However, the indication that an emergency call service is active in the IMS session may be provided in other in manners in other example embodiments.

The PCEF in the PGW 14 may create the bearers for the emergency call service, such as an eCall session, according to the PCC rule and the QoS parameters. In this regard and as shown in operation 4 of FIG. 5, the PGW may transmit a Create Bearer Request including the eCall information, such as over the S5/S8 reference points when the dedicated bearer for QoS class identifier (QCI)=1 is created, and an MME 26 receives the Create Bearer Request over the S11 interface from the SGW 14. The MME may store the eCall information, such as to enable the eCall information to be subsequently made available, for example, over the Sv interface to the MSC as described below, and the remainder of the operations for setting up the IMS session including the emergency call service, such as an eCall session between the UE 10 and the PSAP 18 may be conducted, as shown in operations 5 and 6 of FIG. 5.

In operations 5 and 6 involving the S5/S8 and S11 reference points, the indication that an emergency call service is active may be carried by re-using the bearer flags in the Bearer Context information element (IE) in the Create Bearer Request and adding an additional flag indicative of the emergency call service being active. For example, bit 5 may be added to the Bearer Context IE to indicate that the bearer is utilized for IMS emergency call service, such as an eCall session, and is a candidate for PS-to-CS handover. However, the indication that an emergency call service is active may be provided in other manners such as by the inclusion of a new value in the Allocation-Retention-Priority AVP in the Default-evolved packet system (EPS)-Bearer-QoS AVP.

In operation 7 of FIG. 5, following the setup of the IMS session including the emergency call service, the MME 26 may receive an indication from the radio access network that an SRVCC handover is required. The MME may then notify the MSC 22 that a handover is required in operation 8. In this example embodiment, the apparatus 40 embodied by or otherwise associated with the MSC may include means, such as the processor 42, the communication interface 46 or the like, for receiving notification of a request from the MME for the emergency call service that is active in the IMS session to be handed over from the packet switched network to the circuit switched network 12. The notification may include eCall information relating to the emergency call service, such as an eCall session, ongoing with the IMS session. For example, the MSC may receive an SRVCC PS-to-CS Request over the Sv interface from the MME when the SRVCC occurs. As shown in operation 9, the apparatus embodied by or otherwise associated with the MSC, such as the processor, the communication interface or the like, may then take actions to continue to support the IMS session including the emergency call service, such as an eCall session.

By way of example, the SRVCC PS-to-CS Request provided by the MME 26 to the MSC 22 over the Sv interface may include an IE having a flag indicative of the emergency call service that is active in the IMS session and that is to be handed over to the circuit switched network 20. In this regard, the flag indicative of an emergency call service is active in the IMS session may be provided by re-using and extending the Sv flags IE of the SRVCC PS-to-CS Request. In this regard, another bit, such as bit 5, could be added to the Sv flags IE in the SRVCC PS-to-CS request to indicate that a handover of the emergency call service that is active in the IMS session is requested by the MME. By way of example, if the MME initiates the PS-to-CS session continuity for an IMS emergency call and the emergency voice (QCI=1) bearer has the eCall flag set, the MME may be configured to send the SRVCC PS-to-CS request with both bit 1 and bit 5 set to true. In this regard, bit 1 is a flag representing the emergency indicator (Emind) so as to indicate an ongoing IMS emergency session and bit 5 is a flag indicating that the emergency call service is active in the IMS session and should be handed over.

Upon receiving the indication that an emergency call service is active in the IMS session upon initiation of SRVCC, such as may be indicated by bit 5 of the SRVCC PS-to-CS request, the MSC 22/MGCF 24 may reserve the media resources to support the emergency call service in the circuit switched network 20, such as by reserving the resources for eCall codec from the MGW 14 and by transmitting an INVITE message to the EATF 16 in the IMS, thereby enabling service continuity for the emergency call service that is active in the IMS session at the time of handover from the packet switched network 12 to the circuit-switched network as indicated by operation 9.

By way of another example, the MSC 22 may be notified of an emergency call service, such as an eCall session, that is active in the IMS session at the time of handover by utilizing an EATF 16 which, in turn, may utilize an SRVCC alerting procedure or a third party call control procedure. In this regard, the apparatus 40 may include means, such as the processor 42, the communication interface 46 or the like, for causing a domain transfer request to be sent to an IMS network, such as the EATF, in response to receiving notification of the handover from the packet switched network 12 to the circuit switched network 20 while an IMS session is ongoing. In this example embodiment, the EATF may detect that the domain transfer request from the SRVCC MSC is a domain transfer for a regular emergency call even though the packet switched network supported an emergency call service that was active in the IMS session upon initiation of the SRVCC. As such, the IMS network, such as the EATF, may provide and the MSC, such as the apparatus and, more particularly, the processor or the communication interface of the apparatus, may receive an indication that an emergency call service, such as an eCall session, is active in the IMS session by receiving the indication in response to sending the domain transfer request.

As shown in FIG. 6 from the perspective of the IMS network, such as the EATF 16, an SRVCC request may be received from the MSC 22. See block 70. The IMS network, such as the EATF, may determine if an emergency call service is active in the IMS session, such as by determining if information regarding an eCall session is included in the source access leg, as shown in block 72. If an emergency call service is not active in the IMS session, the normal session set up operations may continue as shown in block 74. However, if the IMS network, such as the EATF, determines that an emergency call service is active in the IMS session, such as by determining that information regarding an eCall session is included in the source access leg, the IMS network, such as the EATF, may determine whether the domain transfer request, such as the SRVCC request, includes an emergency call media component. For example, the IMS network, such as the EATF, may determine whether information regarding an eCall session is included in the request from the SRVCC MSC. If the domain transfer request does include the emergency call media component, the conventional session set up operations may be continued as shown in block 78. However, if the domain transfer request does not include an emergency call text media component, such as by failing to include information regarding an eCall session, in the request from the MSC even though the IMS network, such as EATF, is aware of the emergency call service being active, such as by the inclusion of information regarding an eCall session in the source access leg, the EATF notify the MSC of the emergency call service that is active in the IMS session, as shown in block 80.

In an example embodiment to which the EATF 16 notifies the MSC 22 that an emergency call service is active in the IMS session using the SRVCC alerting process, the MSC may initially send the domain transfer request, such as a SIP INVITE message, to the IMS network. In an instance in which an IMS session is ongoing, the domain transfer request may be sent to the EATF entity in the IMS network. As described above, the EATF may detect that the request from the MSC is a domain transfer for a regular emergency call even though the packet switched network 12 supported an emergency call service that was active in the IMS session upon initiation of the SRVCC. In this regard, the EATF may have determined that an emergency call service was active based on a service URN from the UE 10 to the PSAP 18. As such, the IMS network, such as the EATF, may inform the MSC regarding the emergency call service that is active in the IMS session.

In an example embodiment, the service centralization and continuity application server (SCC AS) may provide additional information to the MSC 22 in a SIP INFO message following the domain transfer request, such as the initial INVITE message, from the MSC to the SCC AS/access transfer control function (ATCF). The SIP INFO message may include additional information, such as to indicate the session subject for SRVCC is currently in an alerting state or that the session is a conference session. The additional information included in a SIP INFO message may also include an indication that the emergency call service, for example, an eCall session, is active in the IMS session, such as by extending the extensible markup language (XML) schema. Once the MSC receives the indication that the emergency call service is active in the IMS session in the SIP INFO message, the MSC may reserve the media resources in the circuit switched network 20 to support the emergency call service that is active in the IMS session, such as by reserving the resources for an eCall codec, such as an eCall circuit switched voice modem, from the MGW 14.

The state-and-event-information provided by a SIP INFO message is currently defined as:

```
<xs:element name="state-and-event-info" type="Tstate-and-event-info"/>
    <xs:complexType name="Tstate-and-event-info">
        <xs:sequence>
            <xs:element name="state-info" type="xs:string"
            minOccurs="0" maxOccurs="1"/>
            <xs:element name="direction" type="directionType"
            minOccurs="0" maxOccurs="1"/>
            <xs:element name="event" type="xs:string"
            minOccurs="0" maxOccurs="1"/>
            <xs:element name="anyExt" type="anyExtType"
            minOccurs="0" />
            <xs:any namespace="##other" processContents="lax"
            minOccurs="0"
maxOccurs="unbounded"/>
        </xs:sequence>
```

In order to provide additional information regarding the emergency call service being active in the IMS session, an additional media element may be added on the same level as the state-and-event information such that the state-and-event information is not modified. For example, an additional media element may be defined as follows:

```
<xs:element name="media" type="Tmedia"/>
    <xs:complexType name="Tmedia">
        <xs:sequence>
            <xs:element name="mediatype" type="xs:string"
            minOccurs="0" maxOccurs="1"/>
            <xs:element name="anyExt" type="anyExtType"
            minOccurs="0" />
            <xs:any namespace="##other" processContents="lax"
            minOccurs="0"
maxOccurs="unbounded"/>
        </xs:sequence>
```

In this example, the media type contains details of the media. As such, the media type may be defined as follows in an instance in which the SIP INFO message is to provide an indication that the emergency call service is active in the IMS session:

mediatype=text-value text-value=% x65.43.61.6c.6c; "eCall"

Alternatively, an additional text element may be inserted within the state-and-event information message from the EATF 16 and received by the MSC 22 in order to provide the indication that the emergency call service is active in the IMS session. By way of an example, the XML schema for the state-and-event information may be modified such that the xs:sequence additionally includes <xs:element name="mediatype" type="xs:string" minOccurs="0" maxOccurs="1"/>. In order to provide the indication that the emergency call service is active in the IMS session, the media type value may be set equal to text-value and the text-value may, in turn, be set equal to % x65.43.61.6c.6c; "eCall".

As yet another example, an additional text element may be added inside the existing state-and-event information. For example, the XML schema may be modified to include a text-value as illustrated below to indicate that an emergency call service is active in the IMS session:
state-info-values=early-value/pre-alerting-value/text-value
early-value=% x65.61.72.6c.79; "early"
pre-alerting-value=% x70.72.65.2d.61.6c.65.72.74.69.6e.67; "pre-alerting"
text-value=% x65.43.61.6c.6c; "eCall"

In the foregoing examples, the IMS network, such as the EATF 16, may identify that the domain transfer request does not include an emergency call media component even though the IMS network, such as the EATF, is aware of the emergency call service, such as an eCall session, being active in the IMS session and, as such, the IMS network, such as the EATF, may utilize the SRVCC alerting procedure to provide an indication to the MSC 22 that the emergency call service is active in the IMS session, as shown, for example, in FIG. 7. Alternatively, the IMS network, such as the EATF, may utilize a third party call control procedure to provide an indication to the MSC that an emergency call service is active in the IMS session, as shown, for example, in FIG. 8.

As shown in the signaling flow diagrams of FIGS. 7 and 8, the UE 10 and the PSAP 18 can initially negotiate the use of an emergency call service, such as an eCall session, in an IMS session (designated an emergency session) as shown in operation 1. The MME 26 may receive an indication from the radio access network that an SRVCC handover is required and the MME may, in turn, notify the MSC 22 of the impending handover from the packet switched network to the circuit switched network 20. The SRVCC procedures are then conducted to prepare for the handover as set forth by 3GPP technical specification (TS) 24.237 and as shown in operation 4. As shown in FIG. 7, the EATF 16 may transmit and the MSC may receive an indication that the emergency call service, for example, an eCall session, is active in the IMS session, such as by having the indication in a SIP INFO message as shown in operation 5. The MSC acknowledges the SIP INFO message with a SIP 200 response as shown in operation 6. After the MSC takes actions to enable handover of the emergency call service, such as by reserving the necessary media resources from the MGW 14, thereby enabling, for example, interworking for the eCall session between CS voice and SIP as shown in operation 7, the MSC may transmit a SIP INVITE message or an UPDATE message including information regarding the emergency call service that is to be handed over to the EATF and the EATF then takes actions to update the session information to the PSAP, as shown in operations 8 and 9.

Alternatively, as shown in FIG. 8, the EATF 16 may notify the MSC 22 regarding the emergency call service being active in the IMS session by transmitting an indication of an eCall session as a service URN to the MGCF 24, such as in the contact header field of the domain transfer request. The MGCF, in turn, is configured to transmit the indication of the eCall session to the SRVCC MSC, such as within a service category IE in the ISUP call progress (CPG) message, address complete message (ACM) or answer message (ANM). The indication of the eCall session can be sent in an INVITE or UPDATE message as shown in operation 5. As such, the MSC may then reserve the resources from the MGW 14 for the emergency call service, such as for the eCall codec, and may generate a corresponding answer to the EATF, such as a SIP 200 (INVITE/UPDATE) message, as shown in operations 6 and 7. The EATF may then take actions to update the session information to the PSAP 18, as shown in operation 8.

As yet another example, the apparatus 40 may include means, such as the processor 40, the communication interface 44 or the like, for receiving the indication that the emergency call service is active in the IMS session by receiving an indication within a handover complete message. The apparatus of this example embodiment may also include means, such as the processor, the communication interface or the like, for reserving the resources to support the emergency call service, such as an eCall codec, from the MGW 28, 30.

By way of example and pursuant to TS 23.216, when the SRVCC preparation is completed at the network, the UE 10 may receive a handover command via the source radio access technology (RAT), such as from the packet switched network 12. The UE may then move to the target network, such as the circuit switched network 20, and may transmit a relocation/handover complete message to the base station controller (BSC)/radio network controller (RNC) 90 which, in turn forwards the relocation handover complete message to the MSC 92 of the target network, as shown in operations 1, 2 and 3 of FIG. 9. In this example embodiment, the relocation/handover complete messages may include an indication as to whether an emergency call service is active in the IMS session. In response to a relocation/handover complete message that includes an indication that an emergency call service is active in an ongoing IMS session, the MSC may be configured to reserve media resources for the emergency call service in the circuit switched network, such as by reserving resources for the eCall codec, such as an eCall voice modem, from the MGW 14, thereby enabling interworking for the eCall session in CS voice and SIP as shown in operation 4. The MSC may also be configured to transmit a corresponding INVITE message or an UPDATE message to the IMS network, such as the EATF 16, with the message including an indication that the emergency call service, for example, an eCall session, is active in the IMS session as shown in operation 5. The EATF may then take actions to update the session information to the PSAP 18, as shown in operation 6.

In another example embodiment, an emergency call service, such as an eCall session, may be ongoing between the UE 10 and the PSAP 18. The PSAP may therefore request updated MSD information utilizing the SIP protocol. Following a handover, such as in accordance with SR-VCC, SIP messages will no longer be delivered to the UE so the circuit switched network must perform protocol translation to facilitate the provision of updated MSD information, such as shown in FIG. 10.

As shown by operation 0 of FIG. 10, an emergency call service may be ongoing such as a result of an eCall session being in place between the UE 10 and the PSAP 18, such may be supported by a GSM eCall codec, such as an ARM-CS codec, between the UE and the MGW 28, 30 and an AMR-VoIP codec between the MGW and the PSAP as shown in FIG. 2 and described above. The PSAP may determine that updated MSD information should be obtained, such as upon occurrence of a handover pursuant to SR-VCC and may, in turn, transmit a SIP message toward the UE, such as by transmitting the SIP message to the IMS, such as the EATF 16, as shown in operations 1 and 2. The IMS, such as the EATF, may pass the SIP message to the SR-VCC MSC 22 as shown in operation 3. The SRVCC MSC may receive the SIP message requesting updated MSD information and determine that the SIP message may not be delivered to the UE following the handover to the circuit switched network 20 and may perform a protocol conversion by translating the message to an H.248 request containing the request for updated MSD information. See operation 4 of FIG. 10. Although the SRVCC MSC is described to perform the translation, the protocol translation may, instead, be performed by the MGCF 24 which may optionally be co-located with the SRVCC MSC. This H.248 request may then be transmitted to the MGW, as shown in operation 5. Based on the H.248 request, the MGW communicates with the UE using GSM eCall codec to obtain MSD information as shown in operation 6. As such, the MGW may perform another protocol conversion, that is, from H.248 to the protocol of the GSM eCall codec prior to transmission to the UE and then from the protocol of the GSM eCall codec to H.248 upon receipt of the MSD information from the UE. Once the MGW receives the MSD information, the MGW creates an H.248 message containing MSD information and sends the updated MSD information in the H.248 message to the SR-VCC MSC. See operation 7. The SR-VCC MSC extracts the updated MSG information from the H.248 message and creates a SIP message that includes the updated MSD information. See operation 8. The SR-VCC MSC then transmits the SIP message including the updated MSD information toward the PSAP, such as transmitting the SIP message to the IMS, such as the EATF, which, in turn, passes the SIP message to the PSAP, as shown in operations 9 and 10. See also FIG. 11 which depicts the request for updated MSD information in conjunction with a handover in accordance with SRVCC.

As illustrated by the foregoing example embodiments, a method, apparatus and computer program product are provided to facilitate a handover from a packet switched network 12 to a circuit switched network 20 while an IMS session is ongoing. In an instance in which an emergency call service, such as an eCall session, is active in the IMS session at the time of the handover, the method, apparatus and computer program product of an example embodiment may cause the media resources required to support the emergency call service, such as an eCall session, to be reserved in the circuit switched network such that the emergency call service, such as an eCall session, may continue following handover from the packet switched network to the circuit switched network. Thus, the method, apparatus and computer program product of an example embodiment permit emergency call services that are active in an IMS session to continue to be supported following an SRVCC handover to a circuit switched network. Consequently, the MSD provided by the emergency call service, such as an eCall session, may continue to be provided so as to facilitate emergency services.

As described above, FIGS. 4 and 6 illustrate flowcharts of an apparatus 40, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 44 of an apparatus employing an embodiment of the present invention and executed by a processor 42 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:
1. A method comprising:
receiving notification of a handover from a packet switched network to a circuit switched network while an internet protocol multimedia subsystem session is ongoing;

receiving an indication that an emergency call service utilizing an audio codec is active in the internet protocol multimedia subsystem session in order to provide information regarding a vehicle:

determining that media resources in the circuit switched network are required to support the emergency call service, as supplemented by a minimum set of emergency related data, that is active in the internet protocol multimedia subsystem session; and causing the media resources to be reserved in the circuit switched network to support the emergency call service, as supplemented by the minimum set of emergency related data, that is active in the internet protocol multimedia subsystem session;

wherein receiving the indication comprises receiving the indication that the emergency call service is active in the internet protocol multimedia subsystem session that was previously provided via Gx and Gxx reference points by extending a packet switched-to-circuit switched-session-continuity attribute value pair to indicate that a service data flow supports the emergency call service and is a candidate for packet switched to circuit switched continuity.

2. A method according to claim 1 wherein receiving the indication that the emergency call service is active in the internet protocol multimedia subsystem session comprises receiving a request over the Sv interface from the mobility management entity for the emergency call service that is active in the internet protocol multimedia subsystem session to be handed over to the circuit switched network.

3. A method according to claim 1 wherein receiving the indication comprises receiving the indication that the emergency call service is active in the internet protocol multimedia subsystem session that was previously provided via create bearer request over S5/S8 reference points when a dedicated bearer for a quality of service class identifier equal to a predefined value is created.

4. A method according to claim 1 wherein receiving the indication comprises receiving the indication that the emergency call service is active in the internet protocol multimedia subsystem session that was previously stored by a mobility management entity.

5. A method according to claim 1 further comprising causing a domain transfer request to be sent to an internet protocol multimedia subsystem network in response to receiving notification of the handover from the packet switched network to the circuit switched network while the internet protocol multimedia subsystem session is ongoing, wherein receiving the indication that the emergency call service is active in the internet protocol multimedia subsystem session comprises receiving the indication in response to sending of the domain transfer request.

6. A method according to claim 5 wherein receiving the indication that the emergency call service is active in the internet protocol multimedia subsystem session comprises receiving a state-and-event information message from an emergency access transfer function that includes an element indicating that the emergency call service is active in the internet protocol multimedia subsystem session.

7. A method according to claim 5 wherein receiving the indication that the emergency call service is active in the internet protocol multimedia subsystem session comprises receiving a service uniform resource name that provides the indication that the emergency call service is active in the internet protocol multimedia subsystem session.

8. A method according to claim 1 further comprising receiving a request for an updated minimum set of data, performing a protocol conversion upon the request following the handover from the packet switched network to the circuit switched network and causing a request for the updated minimum set of data to be transmitted toward a user equipment following the protocol conversion.

9. A method according to claim 8 further comprising receiving the updated minimum set of data, performing a protocol conversion upon the updated minimum set of data and causing the updated minimum set of data to be transmitted toward a public safety answering point following the protocol conversion.

10. An apparatus comprising at least one processor and at least one memory including computer program code, the at least one memory and the computer program code configured to, with the processor, cause the apparatus to at least:

receive notification of a handover from a packet switched network to a circuit switched network while an internet protocol multimedia subsystem session is ongoing;

receive an indication that an emergency call service utilizing an audio codec is active in the internet protocol multimedia subsystem session in order to provide information regarding a vehicle:

determine that media resources in the circuit switched network are required to support the emergency call service, as supplemented by a minimum set of emergency related data, that is active in the internet protocol multimedia subsystem session; and cause the media resources to be reserved in the circuit switched network to support the emergency call service, as supplemented by the minimum set of emergency related data, that is active in the internet protocol multimedia subsystem session;

wherein the at least one memory and the computer program code are configured to, with the processor, cause the apparatus to receive the indication by receiving the indication that the emergency call service is active in the internet protocol multimedia subsystem session that was previously provided via Gx and Gxx reference points by extending a packet switched-to-circuit switched-session-continuity attribute value pair to indicate that a service data flow supports the emergency call service and is a candidate for packet switched to circuit switched continuity.

11. An apparatus according to claim 10 wherein the at least one memory and the computer program code are configured to, with the processor, cause the apparatus to receive the indication that the emergency call service is active in the internet protocol multimedia subsystem session by receiving a request over the Sv interface from the mobility management entity for the emergency call service that is active in the internet protocol multimedia subsystem session to be handed over to the circuit switched network.

12. An apparatus according to claim 10 wherein the at least one memory and the computer program code are configured to, with the processor, cause the apparatus to receive the indication by receiving the indication that the emergency call service is active in the internet protocol multimedia subsystem session that was previously provided via a create bearer request over S5/S8 reference points when a dedicated bearer for a quality of service class identifier equal to a predefined value is created.

13. An apparatus according to claim 10 wherein the at least one memory and the computer program code are configured to, with the processor, cause the apparatus to receive the indication by receiving the indication that the emergency call service is active in the internet protocol multimedia subsystem session that was previously stored by a mobility management entity.

14. An apparatus according to claim 10 wherein the at least one memory and the computer program code are further configured to, with the processor, cause the apparatus to cause a domain transfer request to be sent to an internet protocol multimedia subsystem network in response to receiving notification of the handover from the packet switched network to the circuit switched network while the internet protocol multimedia subsystem session is ongoing, wherein the at least one memory and the computer program code are configured to, with the processor, cause the apparatus to receive the indication that the emergency call service is active in the internet protocol multimedia subsystem session by receiving the indication in response to sending of the domain transfer request.

15. An apparatus according to claim 14 wherein the at least one memory and the computer program code are configured to, with the processor, cause the apparatus to receive the indication that the emergency call service is active in the internet protocol multimedia subsystem session by receiving a state-and-event information message from an emergency access transfer function that includes an element indicating that the emergency call service is active in the internet protocol multimedia subsystem session.

16. An apparatus according to claim 14 wherein the at least one memory and the computer program code are configured to, with the processor, cause the apparatus to receive the indication that the emergency call service is active in the internet protocol multimedia subsystem session by receiving a service uniform resource name that provides the indication that the emergency call service that is active in the internet protocol multimedia subsystem session.

17. An apparatus according to claim 10 wherein the at least one memory and the computer program code are further configured to, with the processor, cause the apparatus to receive a request for an updated minimum set of data, perform a protocol conversion upon the request following the handover from the packet switched network to the circuit switched network and cause a request for the updated minimum set of data to be transmitted toward a user equipment following the protocol conversion.

18. An apparatus according to claim 17 wherein the at least one memory and the computer program code are further configured to, with the processor, cause the apparatus to receive the updated minimum set of data, perform a protocol conversion upon the updated minimum set of data and cause the updated minimum set of data to be transmitted toward a public safety answering point following the protocol conversion.

* * * * *